T. R. White,
Rock Drill.

N° 63,681. Patented Apr. 9, 1867.

Witnesses:
Worbotham
John Parker.

Inventor:
T. R. White
By his Atty
H. Howson

United States Patent Office.

T. R. WHITE, OF PHILADELPHIA, PENNSYLVANIA, ASSIGNOR TO HIMSELF AND W. G. BEDFORD, OF SAME PLACE.

*Letters Patent No. 63,681, dated April 9, 1867; antedated March 29, 1867.*

IMPROVED ROCK-DRILL.

*The Schedule referred to in these Letters Patent and making part of the same.*

TO ALL WHOM IT MAY CONCERN:

Be it known that I, T. R. WHITE, of Philadelphia, Pennsylvania, have invented certain improvements in Rock-Drills; and I do hereby declare the following to be a full, clear, and exact description of the same, reference being had to the accompanying drawing, and to the letters of reference marked thereon.

My invention consists of a drill composed of a stock and certain cutters constructed and arranged as fully described hereafter, so as to be firmly secured to the stock, and detached when required. My invention further consists of certain radial and curved cutting and reaming edges, so arranged as to insure the rapid cutting away of the rock, without the necessity of frequently re-sharpening the cutters.

In order to enable others skilled in the art to make and use my invention, I will now proceed to describe its construction and operation. On reference to the accompanying drawing, which forms a part of this specification—

Figure 1:
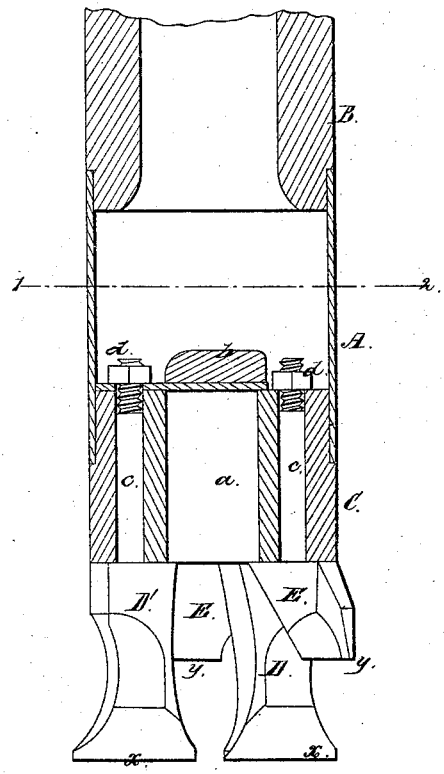

Figure 1 is a sectional view of my improved rock-drill, attached to the lower end of a hollow drill-stock.

Figure 2:
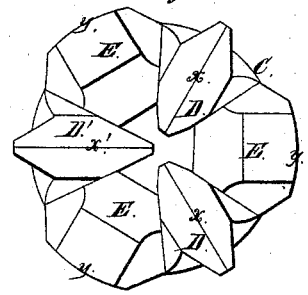

Figure 2, an inverted plan view; and

Figure 3:
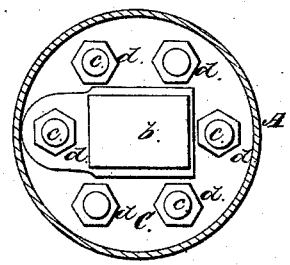

Figure 3, a sectional plan on the line 1–2, fig. 1.

A represents the lower end of a hollow drill-stock or reservoir, to which is fitted a cylindrical block, C. An opening, $a$, in the centre of the block C, is covered by a flap-valve, $b$, and through six holes in the cylinder extend an equal number of rods, $c$, secured to six metal blocks or sections, D D D and E E E, which are confined to the cylinder by nuts, $d$, as shown in figs. 1 and 3. The sections D are longer than the sections E, and the sides of each section are bevelled so that the several sections may be packed together, fitting with radial joints, as seen in fig. 2. The sections D are bevelled at the lower ends, so as to form three radial cutting edges, $x \, x \, x'$, the latter extending to the centre of the drill, while the other two extend to within a short distance from this point. The sections E project laterally a short distance beyond the cylinder C, and are so shaped as to form three curved reaming edges, $y \, y \, y$. The operating rod or rope may be attached directly to the upper end of the stock or reservoir A, or the latter may be secured to the lowermost of a series of tubes extending to the top of the well, and having a reciprocating vertical motion imparted to them by any suitable mechanism. As the drill is brought against the rock, the latter will be split and broken by the cutting edges $x \, x'$ of the cutters D, while the reaming edges $y$ will cut away the rock so as to form a circular opening, the detritus and water in the well being carried by the action of the drill and valve $b$ into the reservoir A. The sides of the different cutters, D and E, being in close contact, they are effectually maintained in their proper places. When the cutters have to be detached, in order that they may be sharpened, or for any other purpose, the block C is disconnected from the tube, and the nuts $d$ are detached from the rods $c$, when the different sections are at liberty to be withdrawn. I have found that by so arranging the cutters and reamers that the edges $x$ and $y$ shall occupy the position in respect to each other shown in fig. 2, a most efficient drill is produced, the rock being rapidly cut away without the necessity of frequently re-sharpening the drill-cutters.

Without confining myself to any particular number of cutters, or to the precise mode herein described of securing the cutters to the stock, I claim as my invention, and desire to secure by Letters Patent—

1. The combination of a drill-stock and detachable cutters D E, when the latter are constructed and adapted to each other, and for attachment to a stock, substantially as and for the purpose specified.

2. The detachable block C, in combination with the drill-stock, and with the detachable cutters D E, their rods $c$, and nuts $d$, or their equivalents, the whole being constructed and arranged substantially as and for the purpose set forth.

3. A rock-drill having three radial and three curved cutting edges arranged in respect to each other as shown and described.

In testimony whereof I have signed my name to this specification in the presence of two subscribing witnesses.

THOS. R. WHITE.

Witnesses:
CHAS. E. FOSTER,
JOHN WHITE.